United States Patent
Trim et al.

(10) Patent No.: US 10,964,113 B2
(45) Date of Patent: Mar. 30, 2021

(54) CONNECTIVITY MECHANISM UTILIZING AUGMENTED REALITY

(71) Applicant: International Business Machines Corporation, Armonk, NY (US)

(72) Inventors: Craig M. Trim, Ventura, CA (US); Stefan van Der Stockt, Austin, TX (US); Jeremy R. Fox, Georgetown, TX (US); Zachary A. Silverstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/445,323

(22) Filed: Jun. 19, 2019

(65) Prior Publication Data

US 2020/0402311 A1 Dec. 24, 2020

(51) Int. Cl.
| | |
|---|---|
| *G06T 19/00* | (2011.01) |
| *G06N 20/00* | (2019.01) |
| *G06F 16/9535* | (2019.01) |
| *G06F 16/9537* | (2019.01) |

(52) U.S. Cl.
CPC ........ *G06T 19/006* (2013.01); *G06F 16/9535* (2019.01); *G06F 16/9537* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 7,788,188 B2 | 8/2010 | Kramer | |
| 8,539,359 B2 | 9/2013 | Rapaport | |
| 2004/0220922 A1 | 11/2004 | Lovison | |
| 2012/0094763 A1 | 4/2012 | Khan | |
| 2012/0142429 A1 | 6/2012 | Muller | |
| 2012/0156668 A1 | 6/2012 | Zelin | |
| 2014/0107816 A1* | 4/2014 | Guedalia | G06F 19/3481 700/91 |
| 2015/0073698 A1* | 3/2015 | Samuel | H04W 4/023 701/422 |
| 2016/0206961 A1* | 7/2016 | Taylor | A63F 13/795 |
| 2016/0226803 A1 | 8/2016 | Ashoori | |
| 2017/0046439 A1 | 2/2017 | Gellis | |

(Continued)

FOREIGN PATENT DOCUMENTS

WO 0201405 A1 1/2002

OTHER PUBLICATIONS

Francisco et al., "Mixing the Game Experience with the Experience of Meeting People," 2018 IEEE Games, Entertainment, Media Conference (GEM), Galway, 2018, pp. 1-9.

(Continued)

*Primary Examiner* — Steven Z Elbinger
(74) *Attorney, Agent, or Firm* — Monchai Chuaychoo

(57) ABSTRACT

An approach for pathing users of an AR (Augmented Reality) software event is provided. The approach includes retrieving a matched pair of users based on a social media and game profile. The approach determines the current event of the matched pair and creates a new event, requiring cooperative engagement between the matched pair. Based on the status notification from the matched pair associated with the created new event, the approach re-match the pairs for future and new AR event.

15 Claims, 5 Drawing Sheets

(56) References Cited

U.S. PATENT DOCUMENTS

| | | | |
|---|---|---|---|
| 2017/0076000 A1 | 3/2017 | Ashoori | |
| 2017/0173474 A1* | 6/2017 | Bangdiwala | A63F 13/795 |
| 2017/0193614 A1* | 7/2017 | Kalyanaraman | G06Q 30/0239 |
| 2018/0288354 A1* | 10/2018 | Anderson | G06T 11/60 |
| 2018/0367483 A1* | 12/2018 | Rodriguez | H04L 51/046 |
| 2019/0124471 A1* | 4/2019 | Chelnik | G06F 16/9535 |
| 2019/0311539 A1* | 10/2019 | Hogue | G06F 3/011 |
| 2020/0078688 A1* | 3/2020 | Kaethler | A63F 13/35 |

OTHER PUBLICATIONS

Guo, Danyang, "Playercharacter Identification by Personality Matching, Perceived Personalization and Positive/Negative Ingame Experience", University of Illinois at Urbana Champaign, 2017, Thesis, <https://pdfs.semanticscholar.org/a4fe/7e2edddb7838da0ee8d6882c591577635dir.pdf>, 54 pages.

Jozuka, Emiko, "Why won't 541,000 young Japanese leave the house?" CNN, Sep. 12, 2016, <https://www.cnn.com/2016/09/11/asia/japanese-millennials-hikikomori-social-recluse/index.html>, 7 pages.

Khullar, Dhruv "Human Touch How Social Isolation Is Killing Us", New York Times, The Upshot, Dec. 22, 2016, <https://www.nytimes.com/2016/12/22/upshot/how-social-isolation-is-killing-us.html>, 8 pages.

Kohll, Alan, "5 Reasons Social Connections Can Enhance Your Employee Wellness Program", Forbes, Jan. 31, 2018, <https://www.forbes.com/sites/alankohll/2018/01/31/5-ways-social-connections-can-enhance-your-employee-wellness-program/#96156ad527c4>, 9 pages.

McDonald, Cheyenne, "Friendships are more important than family and can boost our health and happiness as we age", DailyMail.com, Science & Tech, Jun. 7, 2017, <https://www.dailymail.co.uk/sciencetech/article-4582734/Study-finds-friends-strongly-linked-happiness.html>, 36 pages.

Stewart, Bart, "Personality and Play Styles: A Unified Model", Gamasutra, The Art and Business of Making Games, Copyright © 2019 UBM Tech, <https://www.gamasutra.com/view/feature/6474/personality_and_play_styles_a_.php?print=1>, 13 pages.

"Social Media Global Market Report 2018", ReportLinker, Feb. 2018, 3 pages, <https://web.archive.org/web/20180916212920/https://www.reportlinker.com/p04442254/Social-Media-Global-Market-Briefing.html>.

Alba, Jessica, "Top 10 Tips to Increase Android App Engagement With User", PCskull.com, downloaded from the internet on May 21, 2020, 13 pages, <https://www.pcskull.com/increase-android-app-engagement/>.

* cited by examiner

CONNECTIVITY MECHANISM UTILIZING AUGMENTED REALITY

BACKGROUND OF THE INVENTION

The present invention relates generally to the field of software and gaming, and more particularly to providing a collaborative path through the use of Augmented Reality.

AR (Augmented reality) is an enhanced version of reality created by the use of technology to overlay digital information on an image in the real physical world. The digital information can include multiple sensory modality such as visual, auditory, haptic, somatosensory and olfactory. The overlaid sensory information can be constructive (i.e. additive to the natural environment), or destructive (i.e. masking of the natural environment). The AR experience is interwoven harmoniously with the physical world such that it is perceived as an immersive part of the real environment. Thus, AR can transform a user's perception of a real-world environment. In contrast, VR (virtual reality) completely replaces the user's real-world environment with a simulated one.

AR technology can and have been applied to the gaming industry. Several games were developed for prepared indoor environments, such as AR air hockey, collaborative combat against virtual enemies, and AR-enhanced pool table games. Augmented reality allowed video game players to experience digital game play in a real-world environment such as Pokémon Go™.

SUMMARY

Embodiments of the present invention disclose a computer-implemented method, computer program product and a computer system for facilitating social interaction utilizing AR (Augmented Reality). The method may be retrieving user-matched pairing for a first user and a second user; retrieving a first AR event associated with the first user and a second AR event associated with the second user; retrieving a first location of the first user and a second location of the second user, determining a distance between the first location and the second location against a predetermined threshold; responsive to determining that the distance is less than the predetermined threshold, creating a modified AR event based on the retrieved first location and the second location; dynamically adjusting the modified event based on machine learning; and receiving feedback of the modified AR event from the first user and the second user.

The computer program product may include one or more non-transitory computer readable storage media and program instructions stored on the one or more non-transitory computer readable storage media, the program instructions comprising: program instructions to retrieve user-matched pairing for a first user and a second user; program instructions to retrieve a first AR event associated with the first user and a second AR event associated with the second user; program instructions to retrieve a first location of the first user and a second location of the second user, program instructions to determine a distance between the first location and the second location is less than a predetermined threshold; responsive to the distance is less than the predetermined threshold, program instructions to retrieve create a modified AR event based on the retrieved first location and the second location; program instructions to dynamically assign the modified event to the first user and the second user; and program instructions to receive feedback of the modified AR event from the first user and the second user.

The computer system may include one or more computer processors; one or more computer readable storage media; program instructions stored on the one or more computer readable storage media for execution by at least one of the one or more computer processors, the program instructions comprising: program instructions to retrieve user-matched pairing for a first user and a second user; program instructions to retrieve a first AR event associated with the first user and a second AR event associated with the second user; program instructions to retrieve a first location of the first user and a second location of the second user, program instructions to determine a distance between the first location and the second location is less than a predetermined threshold; responsive to the distance is less than the predetermined threshold, program instructions to retrieve create a modified AR event based on the retrieved first location and the second location; program instructions to dynamically assign the modified event to the first user and the second user; and program instructions to receive feedback of the modified AR event from the first user and the second user.

DETAILED DESCRIPTION

Figure 1:
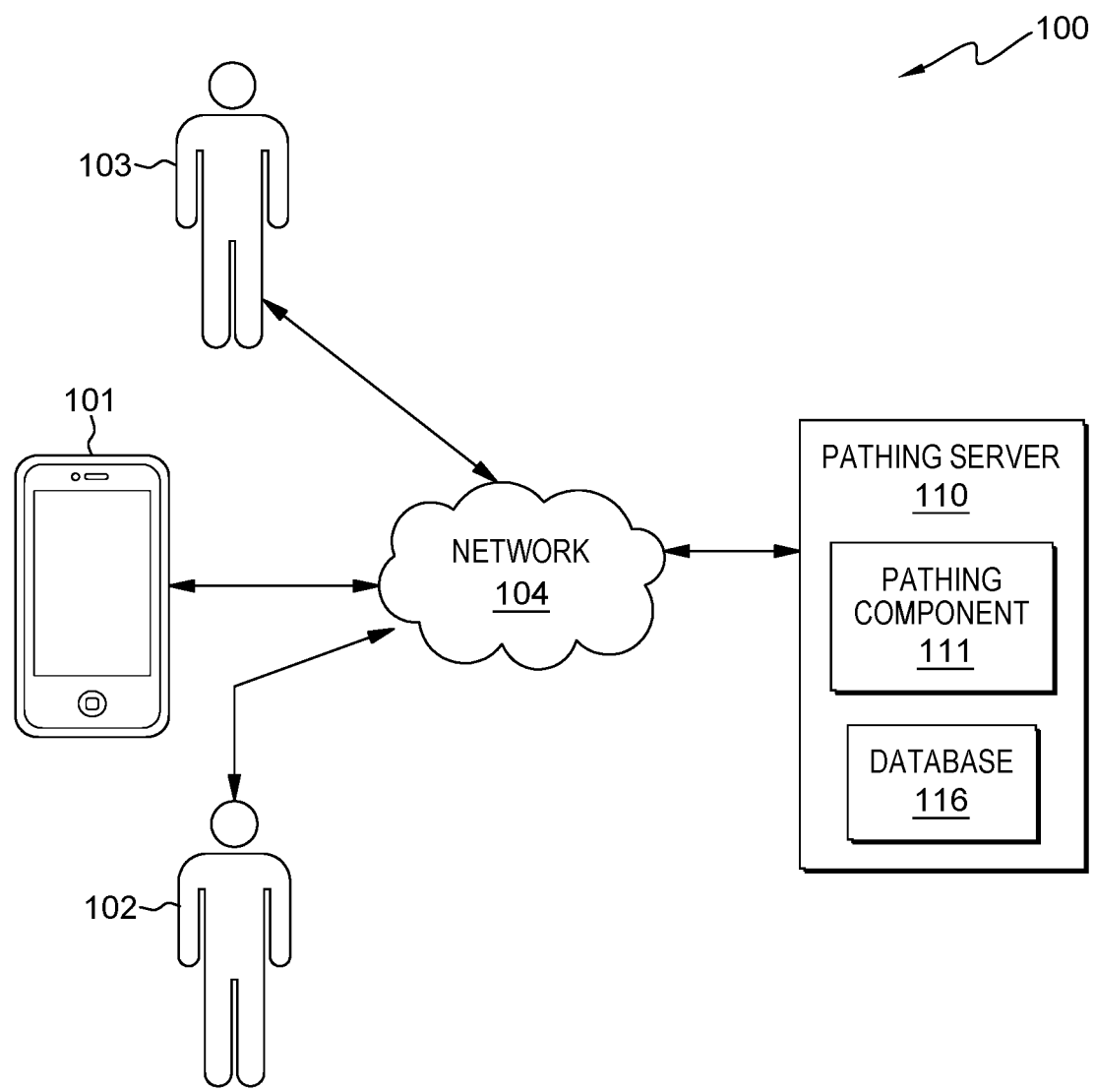
FIG. 1 is a functional block diagram illustrating an AR pathing environment, designated as 100, in accordance with an embodiment of the present invention.

Embodiments of the present invention allow for players of an MMO (Massively Multiplayer Online) AR (Augmented Reality) games to play cooperatively on a modified mission, by incentivizing players to collect more points and/or complete the mission within a predetermine time.

Some embodiments of the present invention recognize that an improvement of a game experience (e.g., lower latency, increased responsiveness, faster rendering, shorter queue times, etc.) associated with an MMO AR platform can be realized by creating new game instances customized for the players who chose to play cooperatively instead of choosing solo missions.

Some embodiments of the present invention recognize that an improvement of a game experience associated with an MMO AR platform can be realized by distributing players to underpopulated game areas controlled, hosted, and rendered by under-utilized servers or nodes. This embodiment recognizes that incentivizing players located in densely concentrated game areas to play (e.g., move) to underpopulated areas, reduces the amount of system memory, computer processors, and related system hardware required for a satisfactory gaming experience.

Some embodiments of the present invention provide the users the ability to interact with other users in the physical space while performing AR tasks. For example, players can be involved in an MMO games that utilizes AR in the real world (e.g., Pokémon Go™, etc.). Typically, users/players follow an individual mission (or event) in the game but never interact with other players in the real world. An event can be defined as an occurrence (planned or unplanned) as it relates to a participant's experience within the AR environment. For example, a bonus mission in an MMO game can be define as an event. In another example, a corporate sales training simulation utilizing AR can be define as event. Within the same embodiment of the invention, a social module/component can be created and attached to an existing game system. This social module/component encourages players to interact cooperatively in the AR world and in the physical world. However, players are chosen by the system to play cooperatively based on similar interests (i.e., they are "matched" before the start of the mission based on social media profile). Therefore, after the mission, a strong social bond can be built between those players for future missions and/or real-world interaction. The assumption is the more opportunities for players allowed to interact with each other, the greater the social connections and the following engagement with each other will become better.

Implementation of embodiments of the invention may take a variety of forms, and exemplary implementation details are discussed subsequently with reference to the Figures.

A detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

FIG. 1 is a functional block diagram illustrating AR path environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

AR path environment 100 includes mobile device 101, user one 102, user two 103 and pathing server 110. All (e.g., 101, 102, 103 and 110) elements are all interconnected over network 104.

Mobile devices 101 are one or more electronic computing devices capable of running MMO AR games or any AR simulations such as, but is not limited to, military training, vocational training (e.g., surgeons, firefighters, pilots, etc.) and corporate training (e.g., factory workers, sales force, etc.)

In other embodiments, mobile device 101 is an IoT (Internet of Things) device such as, but is not limited to, smart camera, monitor and sensors. In yet another embodiment, mobile device 101 can be, but is not limited to, AR glasses, screens and head-mounted displays.

User one 102 is a person capable of utilizing mobile device 101. User one can be a first player participating in an MMO AR game. In other embodiments, user one can be the second participant of any AR simulations such as, but is not limited to, military training, vocational training (e.g., surgeons, firefighters, pilots, etc.) and corporate training (e.g., factory workers, sales force, etc.).

User two 103 is a person capable of utilizing mobile device 101. User two can be a second player participating in an MMO AR game. In other embodiments, user two can be the second participant of any AR simulations such as, but is not limited to, military training, vocational training (e.g., surgeons, firefighters, pilots, etc.) and corporate training (e.g., factory workers, sales force, etc.).

Pathing server 110 can be a standalone computing device, a management server, a web server, a mobile computing device, or any other electronic device or computing system capable of receiving, sending, and processing data. In other embodiments, pathing server 110 can represent a server computing system utilizing multiple computers as a server system, such as in a cloud computing environment. In another embodiment, pathing server 110 can be a laptop computer, a tablet computer, a netbook computer, a personal computer (PC), a desktop computer, a personal digital assistant (PDA), a smart phone, or any other programmable electronic device capable of communicating other computing devices (not shown) within AR path environment 100 via network 104. In another embodiment, pathing server 110 represents a computing system utilizing clustered computers and components (e.g., database server computers, application server computers, etc.) that act as a single pool of seamless resources when accessed within AR path environment 100. Pathing server 110 includes pathing component 111 and database 116.

Network 104 can be, for example, a telecommunications network, a local area network (LAN), a wide area network (WAN), such as the Internet, or a combination of the three, and can include wired, wireless, or fiber optic connections. Network 104 can include one or more wired and/or wireless networks that are capable of receiving and transmitting data, voice, and/or video signals, including multimedia signals that include voice, data, and video information. In general, network 104 can be any combination of connections and protocols that can support communications between server 110 and other computing devices (not shown) within AR path environment 100.

Pathing component 111 allows for coordinating users (e.g., players, participants, etc.) that have similar profiles (e.g., share similar social media interests, etc.) into cooperating in AR style mission (e.g., event) in the real world. Pathing component 111 will be described in greater details in regard to FIG. 2. It is noted that the term mission and event can be used interchangeably in the disclosure.

Database 116 is a repository for data used by pathing component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within AR pathing environment 100, provided that pathing component 111 has access to database 116. Database 116 may store information associated with, but is not limited to, one or more profiles of game players, location of players, time of gaming mission.

Figure 2:
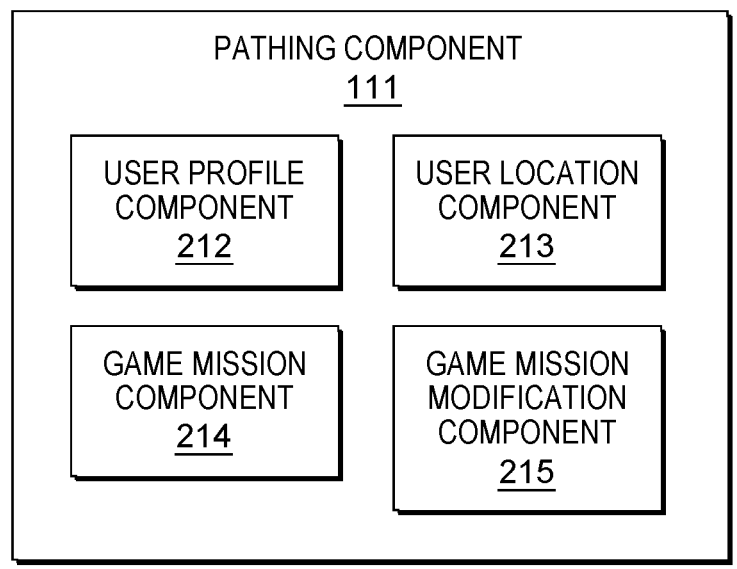
FIG. 2 is a functional block diagram illustrating pathing component in accordance with an embodiment of the present invention.

FIG. 2 is a functional block diagram illustrating pathing component 111 in accordance with an embodiment of the present invention. Pathing component 111 includes user profile component 212, user location component 213, game mission component 214 and game mission modification component 114. It is noted that pathing component 111 can be implemented as a separate module to an existing MMO AR game platform. For example, in Pokemon Go™, an in-game advertisement such as, "Join Trainers in your area and work together to capture bigger Pokemon™!!!" can prompt users to join in the separate training mission. In another embodiment, pathing component 111 can be implemented as part of normal feature/function on a newly developed MMO AR game.

As is further described herein below, user profile component 212 of the present embodiment of the invention provides the capability of matching one of more users (i.e., user one 102) with one or more users (i.e., user two 103). To illustrate the functionality of pathing component 111 and subcomponents (e.g., 212, 213, 214), a user case scenario will be used further: Player A, Jim, (i.e., user one 102) and Player B, Eliza, (i.e., user two 103) are frequent players for a MMO AR game called, "Token Grabber", where a user walks around the real world city to grab tokens to further their score. User profile component 212 retrieves the social media (i.e., from social media database) and/or gaming profiles (i.e., from gaming database) of both Jim and Eliza and determines that both share similar interests (e.g., enjoy playing games in the same genre as Token Grabber, likes Pizza, love dogs, enjoys watching the same comedy sitcoms, etc.) and they both live in the same city. It is noted that users of the MMO AR game provides consent (i.e., agree to terms and conditions) to share the social media profile/data belonging to the users for the matching algorithm of the system (i.e., compatibility matching). Any known profile matching techniques in the art (e.g., Gale-Shapley algorithm, etc.) can be used to match one profile against another profile based on, but it is not limited to, interests, hobbies, location and educational background. Furthermore, user profile component 212 is able to leverage machine learning to match profiles after several iterations. It is noted that alternatively, there can be more than two players that are can be a match and the system may prompt those users to follow a cooperative play style mission.

As is further described herein below, user location component 213 of the present embodiment of the invention provides the capability of identifying the real time location of users in the gaming and real world. For example, Jim and Eliza lives five blocks away from each other. The current mission (i.e., solo mission) in Token Grabber that Jim and Eliza have accepted and has separate target destination. Thus, location component 213, leverages location of Jim and Eliza by known location tracking technology such as GPS (Global Positioning System) and correlate the same position in the game space environment. It is noted that user location component 213 can compare the distance between both users (i.e., Jim and Eliza) against a predetermined threshold distance. For example, the predetermined threshold distance can be set to 2500 feet and both users must be within or below that threshold distance. The predetermined distance can be adjusted by the user and/or system administrator (including AI administrator). It is noted that embodiment of the system can wait for the location to change be user (i.e., both players moving closer to each other) before proceeding with creating/modifying an AR event (i.e., game mission) via game mission modification component 215. Or some embodiment of the system can request a list of participants that meets the distance threshold before attempting to match other criteria via user profile component 213.

As is further described herein below, game mission component 214 of the present embodiment of the invention provides the capability of retrieving and replicating the current game mission and target. Game mission component 214 retrieves (i.e., by querying) the game mission and target from the AR MMO game server and further analyzes the mission requirements and mission objective for the currently matched users/players (i.e., Jim and Eliza) from user profile component 212. For example, the current mission for Jim and Eliza are solo pathing for collecting tokens (i.e., will not run into each other in the real world).

As is further described herein below, game mission modification component 215 of the present embodiment of the invention provides the capability of modifying and rendering new mission based on the matched players. There are criteria that must be met before game mission modification component 215 can modify or create a new mission. Any software modification/development technique can be used by the system to modify existing game code (e.g., C, Java, Python, etc.) or to create new game code. Criteria are predetermined and can be adjustable by a system administrator or could be automatically adjusted by the machine learning system. The criteria can include, but it is not limited to, adjacency (i.e., are the players nearby), activity (i.e., are players playing the same game), social match (i.e., are the players are a good social match) and action (i.e., an activity that the players would be interested in the game). For example, Jim and Eliza accepted a new mission in Token Grabber (i.e., met the activity criteria) and goes toward the solo pathing. Jim lives five blocks from Eliza (i.e., met the adjacency criteria). According to social media and other sources (e.g., gaming profile, game achievements, etc.), both Jim and Eliza and deem a match by the system (i.e., met the social criteria). It is noted that any matching algorithm or techniques can be used. Since both met all the criteria, game modification component 215 reconfigures the current accepted mission (i.e., solo mission) and modifies mission objective (i.e., action criteria), creating a bonus mission for Jim and Eliza, so that both Jim and Eliza will cooperate and be in close physical proximity during the new modified mission (see FIG. 3B).

There are several factors which can be used to guide game modification component 215 into creating/modifying a mission with a high degree of confidence for players to accept. These factors are, but is not limited to, removing tasks (i.e. building a cooperative path instead of solo path) that may pull user away, changing task reward (i.e., incentivize players with more points by taking the cooperative path), changing mission marker (i.e., original goal of the mission of solo pathing to new goal for corroborative pathing) and adding a time component (i.e., making sure players are at the location to complete the mission at the same time). The factor of "removing tasks" can include removing the current solo path of each players (i.e., Jim and Eliza) and creating an exclusive new path where only both players will use (i.e., have permission) for the bonus mission. The factor of "changing task reward" allows for some embodiment of the system to incentivize players by adding more or less weight to an object in the game. For example, in the TokenGrabber game, the tokens for a typical solo pathing may be worth 100 points. However, the tokens along the cooperative path may be worth 500 to 1000 points. Hence, adding more weight to the objects of the game can incentive users to play cooperatively. The factor of "changing mission marker" allows for some embodiments of the system to move individual goals for solo paths to a single goal. For example, referring to FIG. 3B, the new created mission marker, target 321 is situated where both players are reaching for the same goal. The factor of "adding a time component" allows for some embodiments of the system to add a time limit to the new bonus mission. For example, referring to Token Grabber, the system set a time limit for the bonus mission to 10 minutes so that both Jim and Eliza can arrive to the bonus area at the similar time. It is noted that the time limit can be adjustable by an administrator. Thus, by adding the time limit, the likelihood that both Jim and Eliza can work cooperatively increases.

Cooperatively play between two or more players can be defined by the following: i) may involve users bumping devices, ii) viewing each other through AR and iii) causing the users to talk to each other in person. For example, referring to Jim and Eliza accepting the bonus mission. They both arrive on the site at the same time and are following the same path. The first token is placed high on a tree, too tall for Jim and Eliza to reach. However, the hint in the game indicates that they should find sculptures in shape of several blocks. They discuss the hint and realized that they should both move the nearby blocks under the tree (together) and help boost each other up to collect the token.

After the bonus mission has completed, the system may ask for user feedback of the cooperative play. For example, the system may ask both users (Jim and Eliza) if they had fun playing together (e.g., satisfaction level, etc.). The feedback will be used to determine if Jim and Eliza should be matched again on future mission.

Alternatively, without using a user feedback system, the system can, through machine learning, determine whether the participants (i.e., Jim and Eliza) enjoyed the bonus mission based on bread crumb trail (geographic markers). The system can detect Jim and Eliza's bread crumb trail and analyze the spatial and time interaction between the two during the bonus mission. For example, if the bread crumb trail both are similar in pattern (spatially and time) then it can be inferred that both Jim and Eliza enjoyed the cooperative play. If the bread crumb trail does not show that both Jim and Eliza near each other then it can be inferred that they did not enjoy the cooperative play.

Game mission modification component 215 can use the following algorithm:

current user location+OID+RNDdirection=Mission Location

Current user location is known through user location component 213. OID (Optimum Interaction Distance) is a distance with no weight modification (weight=1) would be how far the user usually travels while playing the game. This could be derived (through Machine Learning) via how far the user currently goes away from start location in a game session (i.e., an average max radius travelled from the start location of an game session by a user). For example, a user may tend to stay within 200 meters. This is not part of a program/system component, but rather the user's preference/habits. The system (via Machine Learning) can modify the weighting of the reward to move a user and drive them farther. For instance, the game may usually place virtual tokens throughout the world in quantities of 1 to 10. If there is a token stack of 50 tokens at 250 meters, the stacks will entice the user to go 50 extra meters (i.e., typically longer than what the user would consider too far). However, due to the higher incentive (i.e. more tokens), the user would go out of their comfort zone to get it.

RNDdirection is defined as random direction. This is a randomly generated direction by the system for the mission. For example, tokens are placed randomly in the game, "Token Grabber", environment. After the system creates a new map of the game, the tokens will not be placed randomly but somewhere where the radiuses of the users overlap.

Alternatively, in another embodiment, an alternative algorithm can be used to reconfigure mission:

User 1 profile match = User 2 profile match
User 1 location + OID (WeightingModifierUser1) = Mission Location1
User 2 location + OID (WeightingModifierUser2) = Mission Location2
Mission Location1 = Mission Location2

OID(WeightingModifierUser1) and OID(WeightingModifierUser2) are modifiers attached to the rewards/events make an event or reward strong enough to pull the user to desired location. For example, 2× modifier, 4× modifier or 10× modifier can be utilized to "entice" the user to cooperate. It is noted that the system (through machine learning) would increase weighting of the objective for each user to ensure that the user has enough of a reward to maximize chances the user would want to take up this task/game mission. It is noted that a time component can also be used as weighting factor. For example, a critical mission bonus may involve a time factor where players must complete the bonus mission cooperatively within an allotted time to gain the maximum points. Mission Location1 (for user one) and Mission location2 (for user two) are distance calculated by the system in order to "pull" user one and user two together for cooperative style play at the same destination.

In summary, game mission modification component 215 has the ability to remove tasks (i.e. cooperative path instead of solo path) that may pull user away, changes task reward (i.e., incentivize players with more points), changes mission marker (i.e., original goal of the mission) and adds a time component.

In another embodiment, the invention can be used in an AR training simulation software. For example, a military operation decides to create a special elite team. The military uses the invention to determine candidate for the special elite team. Therefore, the military beings pairing individuals based on their military specialty (e.g., explosive expert, marksman, etc.) and/or other sources related to the personality of the potential candidates (e.g., social media activity, movie viewing habit, etc.). The military pairs the potential candidates in a combat mission via an AR simulation. Based on the feedback from the two candidates and/or the bread crumb trails, the military may or may not select the candidate based on both candidate's performance in the cooperative aspect of the combat mission simulation.

In yet another embodiment, the invention can be used in an AR training simulation software by a corporation. For example, a corporation determines potential candidate for a business team (e.g., sales, marketing team, etc.). The interpersonal dynamics of the members is a very important aspect to ensure the success of the team. Therefore, the corporation begins pairing individuals based on their business skillset (e.g., public speaking, annual performance review, sales number, etc.) and/or other sources related to the personality of the potential candidates (e.g., social media activity, online shopping preferences, etc.). The corporation pairs the potential candidates in a door-to-door sales pitch via an AR simulation. Based on the feedback from the two candidates and/or the bread crumb trails, the corporation may or may not select the candidate based on both candidate's performance in the sales simulation.

Figure 3A:
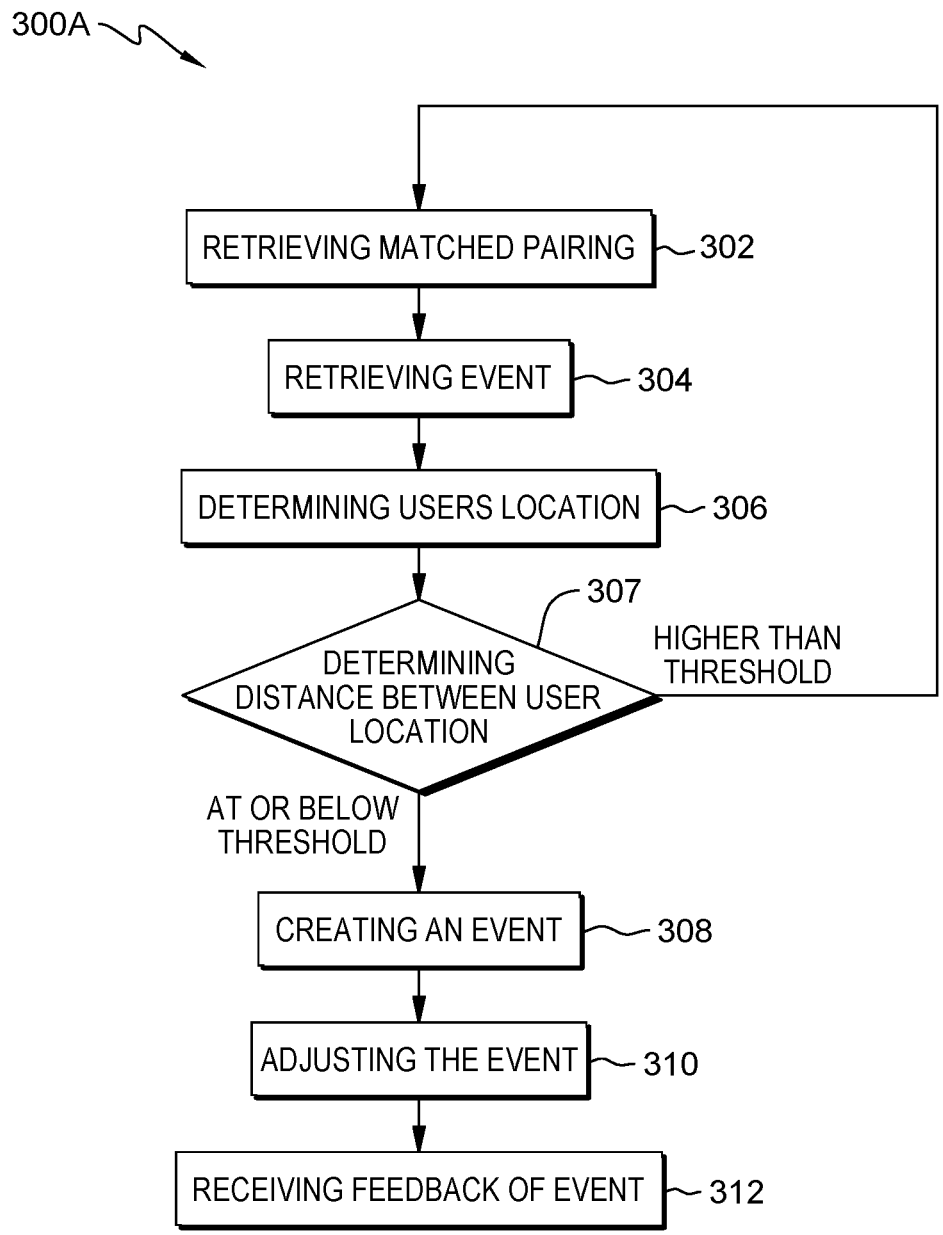
FIG. 3A is a flowchart illustrating the operation of an AR pathing prediction system, designated as 300A, in accordance with an embodiment of the present invention.

FIG. 3A is a flowchart illustrating the activity of pathing component 111, designated as 300A, in accordance with an embodiment of the present invention. The previous use case of Jim and Eliza will be used to further illustrate the steps of the flow chart.

Pathing component 111 retrieves matched pairing (step 302). In an embodiment, pathing component 111 through user profile component 212 retrieved a matched user (i.e., pairing) from the system. For example, Jim and Eliza are deemed a match pair by the system. Therefore, they have been chosen for a cooperative mission/event.

Pathing component 111 retrieves the event (step 304). In an embodiment, pathing component 111 through game mission component 214 retrieves the current mission of both matched users. For example, path component 111 retrieves the current mission that Jim and Eliza are engaged. It is noted that at this stage of the steps of the flowchart, the mission of Jim and Eliza can be solo missions and have reached not cooperative-style mission yet.

Pathing component 111 determines location of user (step 306). In an embodiment, pathing component 111 through user location component 213 determines the location of the matched user. For example, while Jim and Eliza are involved in a separate solo mission, path component 111 determines the location of both participants in the game.

Pathing component 111 determines the distance between the users (decision block 307). In an embodiment, pathing component 111 through user location component 213 determines the distance between user one 102 and user two 103 within the game. Pathing component 111 compares the distance against a predetermined threshold. For example, path component 111 determines that current location of Jim and Eliza are below a predetermined threshold. If pathing component 111 determines that the current location both participants (i.e., Jim and Eliza) are at or below the threshold (i.e., 2500 feet or less) then pathing component 111 proceeds to step 308 ("AT OR BELOW THRESHOLD" branch, decision block 307). However, if pathing component 111 determines that the current location is above the threshold (2500 feet) then pathing component 111 iteratively repeats the process, starting back at step 302 ("HIGHER THAN THRESHOLD" branch, decision block 307).

Pathing component 111 creates an event (step 308). In an embodiment, pathing component 111 through game mission modification component 215 creates a new bonus mission/event based on the location, distance between the users and current mission of the matched users. For example, based having met the predetermined criteria by Jim and Eliza, pathing component 111 creates a bonus mission that involves cooperative style play for Jim and Eliza. Both users (e.g., Jim and Eliza) accept the bonus mission and consent to playing cooperatively. It is noted that players can consent at the beginning of creating a character (i.e., start of the game). Both players (i.e., user one 102 and user two 103) continues towards the new objective target 321 (see FIG. 3B).

Pathing component 111 dynamically adjusts the event (step 310). In an embodiment, pathing component 111 through game mission modification component 215 adjusts the current mission to increase incentives (i.e., weighing factor) for both users to work cooperatively within the game. For example, game mission modification component 215 determines that Jim and Eliza are not playing within close proximity with the modified mission. Therefore, game mission modification component 215 decides to increase the points related to the cooperative mission objective (i.e. target 321) to incentivize both Jim and Eliza to work cooperatively (including bumping devices and talking to each other).

Pathing component 111 receives notification feedback of event (step 312). In an embodiment, pathing component 111 through game mission modification component 215 receives feedback from both players regarding the bonus mission through the AR software app installed on mobile device 101. For example, the system can ask each Jim and Eliza a series of question such as, "Did you enjoy playing with the other player?", "What did you like about the mission?" and "Do you want to play again with the same player on the next mission or would you like a new player?"

In an alternate embodiment, path component 111 can determine the mission status based on the bread crumb of the users. For example, if the bread crumb trail both are similar in pattern (spatially and time) then it can be inferred that both Jim and Eliza enjoyed the cooperative play. If the bread crumb trail does not show that both Jim and Eliza in close proximity to each other then it can be inferred that they did not enjoy the cooperative play.

Figure 3B:
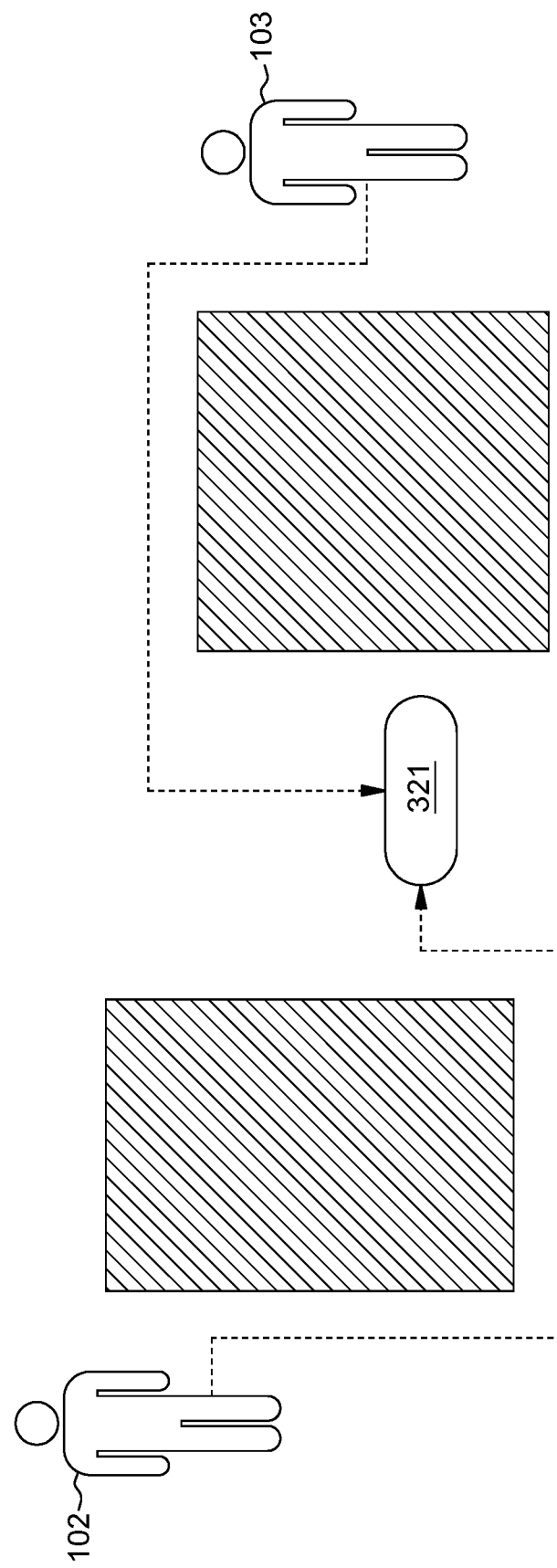
FIG. 3B illustrates the bonus mission route as created by path component 111 for user one 102 and user two 103 to cooperatively play at target 321.

FIG. 3B illustrates the bonus mission route as created by path component 111 for user one 102 and user two 103 to cooperatively play where both are required to meet at target 321.

Figure 4:
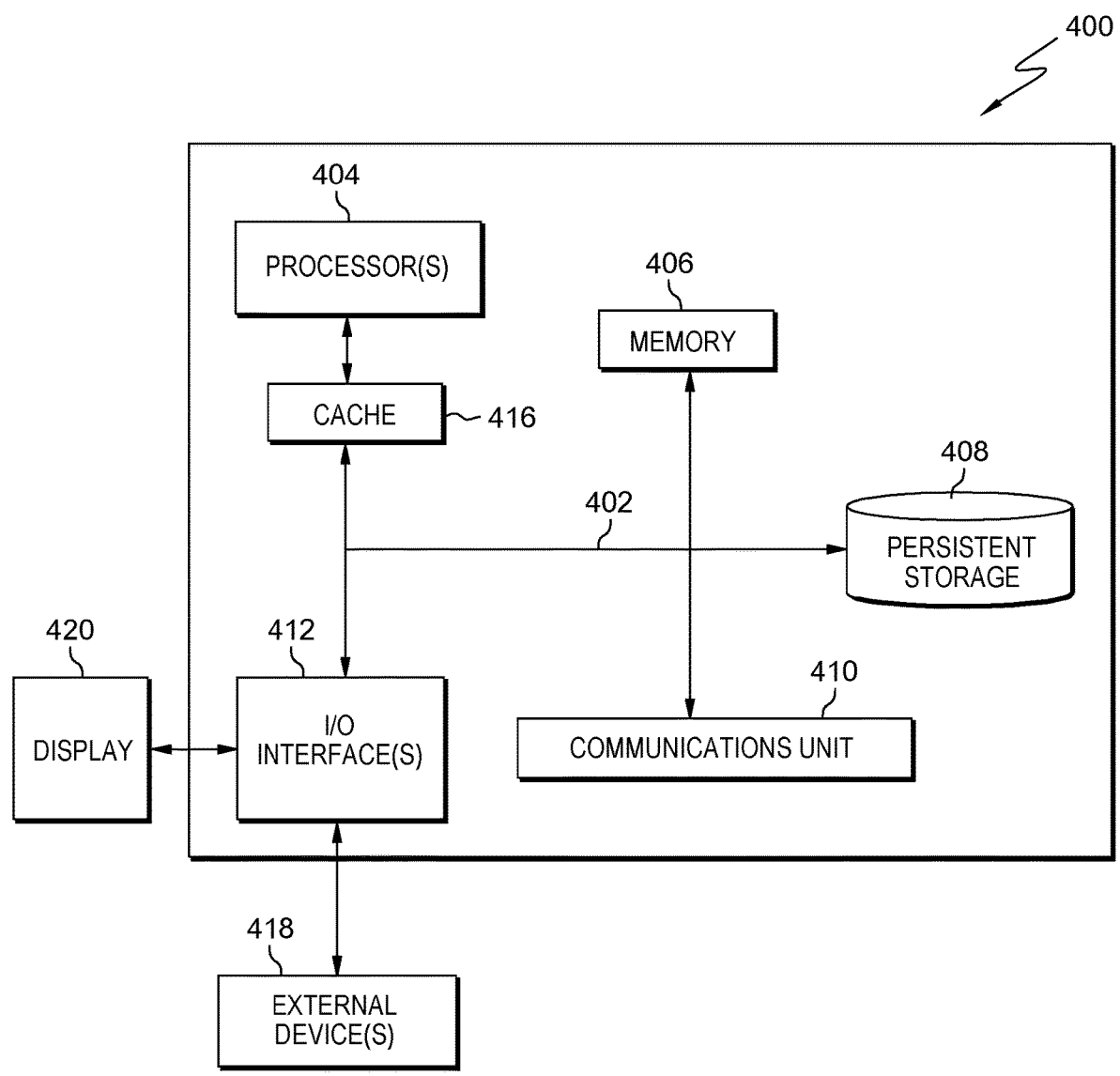
FIG. 4 depicts a block diagram, designated as 400, of components of a server computer capable of executing the AR pathing system within the AR pathing environment, of FIG. 1, in accordance with an embodiment of the present invention.

FIG. 4 depicts a block diagram, designated as 400, of components of the server computer executing the program within the AR pathing environment, of FIG. 1, in accordance with an embodiment of the present invention.

Server 110 can include processor(s) 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processor(s) 407 by holding recently accessed data, and data near recently accessed data, from memory 406.

Program instructions and data used to practice embodiments of the present invention, e.g., pathing component 111 and database 116, can be stored in persistent storage 408 for execution and/or access by one or more of the respective processor(s) 407 of server 110 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of server 110. In these examples, communications unit 410 includes one or more network interface cards. Communications unit 410 may provide communications through the use of either or both physical and wireless communications links. Pathing component 111 and database 116 may be downloaded to persistent storage 408 of server 110 through communications unit 410.

I/O interface(s) 412 allows for input and output of data with other devices that may be connected to server 110. For example, I/O interface(s) 412 may provide a connection to external device(s) 418 such as a keyboard, a keypad, a touch screen, a microphone, a digital camera, and/or some other suitable input device. External device(s) 418 can also include portable computer readable storage media such as, for example, thumb drives, portable optical or magnetic disks, and memory cards. Software and data used to practice embodiments of the present invention, e.g., pathing component 111 and database 116 on server 110, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor or the lenses of a head mounted display. Display 420 can also function as a touchscreen, such as a display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
retrieving user-matched pairing for a first user and a second user;
retrieving a first AR event associated with the first user and a second AR event associated with the second user;
retrieving a first location of the first user and a second location of the second user;
determining a distance between the first location and the second location against a predetermined threshold;
responsive to determining that the distance is less than the predetermined threshold, creating a modified AR event based on the retrieved first location and the second location;
dynamically adjusting the modified AR event based on machine learning, wherein the first location and the second location is used to determine a cooperative path between the first user and the second user and wherein the cooperative path is based on factors that include an additional objective and managing tasks, further comprises:
routing a path between the first and the second user to the modified AR event is based on a first algorithm, wherein the modified AR event includes a cooperative element that guides social interaction between the first and the second user and the first algorithm further comprises:

current user location+OID+RNDdirection=Mission Location, wherein, current user location is based on a location of the first user and the second user, OID (Optimum Interaction Distance) is a distance with no weight modification on how far the first user or the second user usually travels while engaging in an AR software event, RNDdirection is randomly generated direction created by AR software, and Mission Location is a target of the AR software event;
dynamically increasing a weight factor within the modified AR event to incentivize the first and the second user to interact cooperatively; and
receiving feedback of the modified AR event from the first user and the second user.

2. The computer-implemented method of claim 1, wherein retrieving user matched profile based on the first user and the second user, further comprising:
analyzing a first social media profile of the first user and a second social media profile of the second user;
determining a compatibility match between the first social media profile and the second media profile; and
responsive to a matched pairing based on the first social media profile and the second media profile, outputting the matched pairing.

3. The computer-implemented method of claim 1, wherein retrieving the modified AR event associated with the first user and the second user, further comprising:
querying an AR server for the modified AR event associated with the first user and the second user;
retrieving an event data associated with the modified AR event; and
storing the retrieved event data on a database.

4. The computer-implemented method of claim 1, routing a first user to a second user based on a second algorithm, further comprises:

User 1 profile match=User 2 profile match,

User 1 location+OID(WeightingModifierUser1)=Mission Location1,

User 2 location+OID(WeightingModifierUser2)=Mission Location2,

Mission Location1=Mission Location2, wherein user 1 profile match is the retrieved match pairing belonging to the first user, user 2 profile match is the retrieved match pairing belonging to the second user, user 1 location is the first location of the first user, user 2 location is the second location of the second user, OID (WeightingModifierUser1) is weighted optimal interaction distance associated with the first user, OID (WeightingModifierUser2) is weighted optimal interaction distance associated with the second user, and Mission Location1 is a calculated location for the first user and Mission Location2 is a calculated location for the second user.

5. The computer-implemented method of claim 1, wherein receiving a feedback of the modified AR event, further comprising:
sending an event feedback to the first user and the second user;
receiving the event feedback from the first user and the second user;
determining a satisfaction level based on the event feedback; and
in responsive to a positive satisfaction level, re-matching, through machine learning, the first user and the second user for a future AR event.

6. A computer program product comprising:
one or more non-transitory computer readable storage media and program instructions stored on the one or more non-transitory computer readable storage media, the program instructions comprising:
program instructions to retrieve user-matched pairing for a first user and a second user;
program instructions to retrieve a first AR event associated with the first user and a second AR event associated with the second user;
program instructions to retrieve a first location of the first user and a second location of the second user;
program instructions to determine a distance between the first location and the second location is less than a predetermined threshold;
responsive to the distance is less than the predetermined threshold, program instructions to retrieve create a modified AR event based on the retrieved first location and the second location;
program instructions to dynamically adjust the modified AR event to the first user and the second user, wherein the first location and the second location is used to determine a cooperative path between the first user and the second user and wherein the cooperative path is based on factors that include an additional objective and managing tasks further comprises;
program instructions to route a path between the first and the second user to the created event is based on a first algorithm, wherein the modified AR event includes a cooperative element that guides social interaction between the first and the second user and the first algorithm further comprises:

current user location+OID+RNDdirection=Mission Location, wherein, current user location is based on a location of the first user and the second user, OID (Optimum Interaction Distance) is a distance with no weight modification on how far the first user or the second user usually travels while engaging in an AR software event, RNDdirection is randomly generated direction created by the AR software, and Mission Location is a target of AR software event; and
program instructions to dynamically increase a weight factor within the modified AR event to incentivize the first and the second user to interact cooperatively; and
program instructions to receive feedback of the modified AR event from the first user and the second user.

7. A computer program product of claim 6, wherein program instructions to retrieve user matched profile based on the first user and the second user, the computer program product comprising:
program instructions to analyze a first social media profile of the first user and a second social media profile of the second user;
program instructions to determine a compatibility match between the first social media profile and the second media profile; and
responsive to a matched pairing based on the first social media profile and the second media profile, program instructions to output the matched pairing.

8. A computer program product of claim 6, wherein program instructions to retrieve the modified AR event associated with the first user and the second user, the computer program product comprising:
program instructions to query an AR server for the modified AR event associated with the first user and the second user;
program instructions to retrieve an event data associated with the modified AR event; and
program instructions to store the retrieved event data on a database.

9. A computer program product of claim 6, program instructions to route a first user to a second user based on a second algorithm, further comprises:

User 1 profile match=User 2 profile match,

User 1 location+OID(WeightingModifierUser1)=Mission Location1,

User 2 location+OID(WeightingModifierUser2)=Mission Location2,

Mission Location1=Mission Location2, wherein user 1 profile match is the retrieved match pairing belonging to the first user, user 2 profile match is the retrieved match pairing belonging to the second user, user 1 location is the first location of the first user, user 2 location is the second location of the second user, OID (WeightingModifierUser1) is weighted optimal interaction distance associated with the first user, OID (WeightingModifierUser2) is weighted optimal interaction distance associated with the second user, Mission Location1 is a calculated location for the first user and Mission Location2 is a calculated location for the second user.

10. The computer program product of claim 6, wherein program instructions to receive a feedback of the modified AR event, further comprising:
program instructions to send an event feedback to the first user and the second user;
program instructions to receive the event feedback from the first user and the second user;
program instructions to determine a satisfaction level based on the event feedback; and
in responsive to a positive satisfaction level, program instructions to re-match, through machine learning, the first user and the second user for a future AR event.

11. A computer system comprising:
one or more computer processors;
one or more computer readable storage media;
program instructions stored on the one or more computer readable storage media for execution by at least one of the one or more computer processors, the program instructions comprising:

program instructions to retrieve user-matched pairing for a first user and a second user;

program instructions to retrieve a first AR event associated with the first user and a second AR event associated with the second user;

program instructions to retrieve a first location of the first user and a second location of the second user;

program instructions to determine a distance between the first location and the second location is less than a predetermined threshold;

responsive to the distance is less than the predetermined threshold, program instructions to retrieve create a modified AR event based on the retrieved first location and the second location;

program instructions to dynamically adjust the modified AR event based on machine learning, wherein the first location and the second location is used to determine a cooperative path between the first user and the second user and wherein the cooperative path is based on factors that include an additional objective and managing tasks further comprises;

program instructions to route a path between the first and the second user to the modified AR event is based on a first algorithm, wherein the modified AR event includes a cooperative element that guides social interaction between the first and the second user and the first algorithm further comprises:

current user location+OID+RNDdirection=Mission Location, wherein, current user location is based on a location of the first user and the second user, OID (Optimum Interaction Distance) is a distance with no weight modification on how far the first user or the second user usually travels while engaging in an AR software event, RNDdirection is randomly generated direction created by AR software, and Mission Location is a target of the AR software event; and program instructions to dynamically increase a weight factor within the modified AR event to incentivize the first and the second user to interact cooperatively; and program instructions to receive feedback of the modified AR event from the first user and the second user.

12. A computer system of claim 11, wherein program instructions to retrieve user matched profile based on the first user and the second user, the computer system comprising:

program instructions to analyze a first social media profile of the first user and a second social media profile of the second user;

program instructions to determine a compatibility match between the first social media profile and the second media profile; and responsive to a matched pairing based on the first social media profile and the second media profile, program instructions to output the matched pairing.

13. A computer system of claim 11, wherein program instructions to retrieve the modified AR event associated with the first user and the second user, the computer system comprising:

program instructions to query an AR server for the modified AR event associated with the first user and the second user;

program instructions to retrieve an event data associated with the modified AR event; and program instructions to store the retrieved event data on a database.

14. The computer system of claim 11, program instructions to route a first user to a second user based on a second algorithm, further comprises:

User 1 profile match=User 2 profile match,

User 1 location+OID(WeightingModifierUser1)=Mission Location1,

User 2 location+OID(WeightingModifierUser2)=Mission Location2,

Mission Location1=Mission Location2, wherein user 1 profile match is the retrieved match pairing belonging to the first user, user 2 profile match is the retrieved match pairing belonging to the second user, user 1 location is the first location of the first user, user 2 location is the second location of the second user, OID (WeightingModifierUser1) is weighted optimal interaction distance associated with the first user, OID (WeightingModifierUser2) is weighted optimal interaction distance associated with the second user, Mission Location1 is a calculated location for the first user and Mission Location2 is a calculated location for the second user.

15. The computer system of claim 11, wherein program instructions to receive a feedback of the modified AR event, further comprising:

program instructions to send an event feedback to the first user and the second user;

program instructions to receive the event feedback from the first user and the second user;

program instructions to determine a satisfaction level based on the event feedback; and in responsive to a positive satisfaction level, program instructions to re-match, through machine learning, the first user and the second user for a future AR event.

* * * * *